March 4, 1958  C. H. SMOOT  2,825,825

ELECTRICAL CONTROL CIRCUIT

Filed May 31, 1955

INVENTOR.
Charles H. Smoot,
BY
Bair, Freeman & Molinare
ATTORNEYS.

United States Patent Office 2,825,825
Patented Mar. 4, 1958

2,825,825
ELECTRICAL CONTROL CIRCUIT

Charles H. Smoot, Chicago, Ill., assignor, by mesne assignments, to Republic Flow Meters Company, Chicago, Ill., a corporation of Delaware Application May 31, 1955, Serial No. 511,865

7 Claims. (Cl. 307—149)

This invention relates to electrical control circuits and more particularly to a circuit to control a plurality of factors affecting a condition.

It is frequently necessary in industrial processes, combustion control and the like, to control a plurality of factors proportionally or successively. For example, in many processes it is necessary to maintain an accurate ratio between a plurality of factors, such as supplies of separate ingredient and to vary the individual factors proportionally to meet the overall demand. In many industrial processes and in combustion control, using by-product fuel, it is desirable to control one factor only up to the limit of its availability and then to bring in a second factor to meet the overall demand.

It is one of the objects of the present invention to provide an electrical control circuit in which the individual factors are controlled electrically, either proportionally or successively, to meet a demand.

Another object is to provide a control circuit in which an electrical signal corresponding to the total demand is rebalanced by the sum of a plurality of electrical voltages corresponding respectively to individual factors.

According to one feature of the invention, voltages corresponding to the individual factors are added through transformers and electrically balanced against a voltage representative of the total demand.

A further object is to provide a control circuit in which a rebalancing voltage corresponding to one factor only rebalances the demand voltage up to the limit of availability of such factor and thereafter a second factor is controlled in response to the difference between the demand voltage and the first rebalancing voltage.

Figure 1:
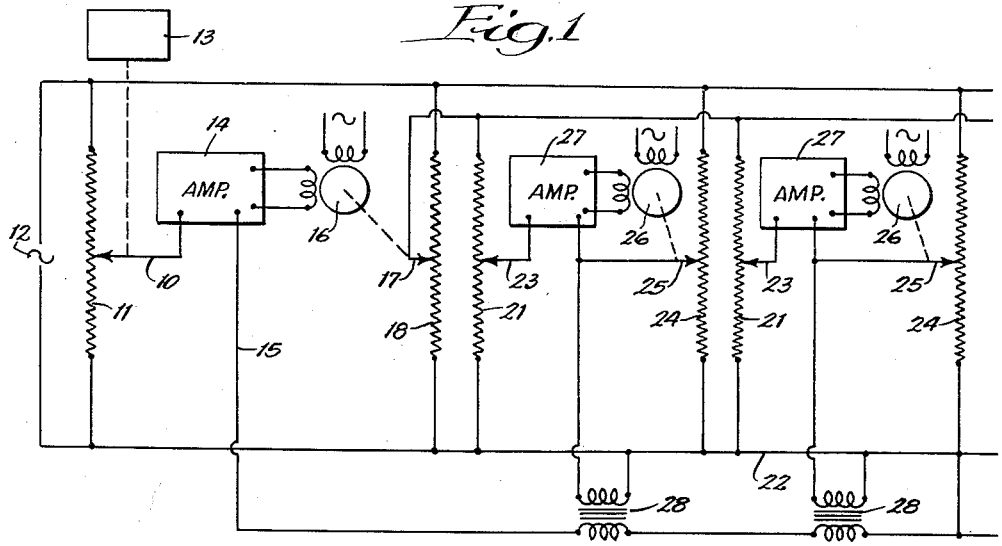
Figure 2:
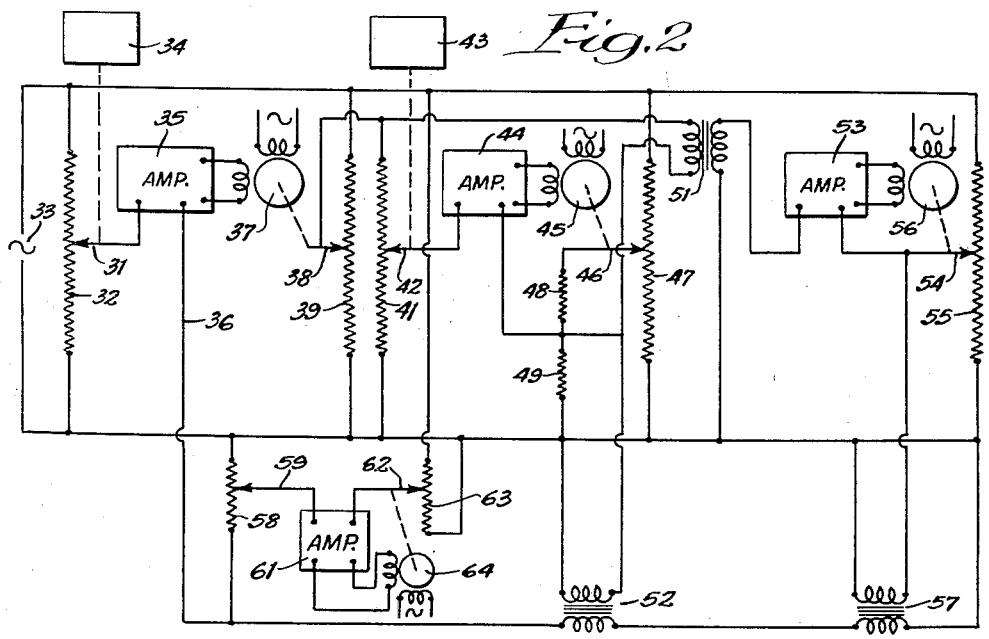

The above and other objects and features of the invention will be more readily apparent from the following description when read in connection with the accompanying drawing, in which:

Figure 1 is a circuit diagram of one form of control circuit embodying the invention, and Figure 2 is a circuit diagram of an alternative circuit to produce successive control.

The circuit of Figure 1 is adapted to control a plurality of separate factors proportionately in response to voltage changes in a signal representative of total demand. As shown, the signal representative of demand is produced by positioning a wiper 10 on a resistor 11, which is connected across an alternating current source 12. The wiper 10 may be moved manually or by a regulator 13 which is responsive to the total demand. The wiper 10 is connected to one input terminal of an amplifier 14 whose other input terminal is connected to a rebalancing return connection 15. The output of the amplifier 14 is connected to the control winding of a two phase reversible motor 16, which is connected mechanically to a wiper 17 to adjust it along on a resistor 18 connected across the source 12.

The voltage produced at the wiper 17 constitutes a control voltage which is transmitted to control devices for the individual factors. As shown in Figure 1, two control devices are provided, which are identical, although any desired number of control devices could obviously be employed. Each control device comprises a resistor 21 connected between the wiper 17 and a ground connection 22 with a wiper 23 adjustable along the resistor 21. A second resistor 24 is connected across the source 12 and has a wiper 25 adjustable therealong by a reversible motor 26. The motor 26 is controlled by an amplifier 27 whose input terminals are connected to the wipers 23 and 25, respectively and whose output terminals supply the control winding of motor 26.

The voltage developed at the wipers 25 of the several control devices is utilized to rebalance the demand signal at the wiper 10. For this purpose each wiper 25 is connected across the primary winding of a transformer 26 and the secondary windings of the transformers 28 are connected in series in the return connection 15.

When the circuit is in balance the total of the several voltages at the several wipers 25, as added through the transformers 26, will equal the voltage at the wiper 10 and all of the motors will be stationary. If there is a change in demand, it will produce a change in the voltage at the wiper 10 and the motor 16 will be caused to run in one direction or the other to change the controlling voltage at the wiper 17 in the same direction as the signal changed. Adjustment of the wiper 17 will change the voltage on the wiper 23 of each of the control devices and will cause the motors 26 to run, thereby to move the wiper 25 in a direction to rebalance the changed voltage at the wipers 23. At the same time, the voltages generated in the transformers 28 will be changed to rebalance the signal voltage at the wiper 10 and to bring the entire system back into balance.

It will be understood that the motors 26 could operate indicating or control devices for the individual factors and further, that anticipating generators could be used in conjunction with each of the motors to prevent overshooting and hunting. In operation of the system it will be apparent that each of the several factors is adjusted in proportion to the changes in the signal voltage so that the desired ratio between the several factors is accurately maintained. The proportion desired between the several factors can be set by manually adjusting the wipers 23 and will be automatically maintained thereafter.

For successive control, as for example in by-product fuel combustion control, a circuit as shown in Figure 2 may be employed. In this circuit the input signal representative of total demand is produced by a wiper 31 adjustable along a resistor 32, which is connected across an alternating current source 33. The wiper 31 may be adjusted by a regulator 34 responsive to changes in total demand.

The wiper 31 is connected to one input terminal of an amplifier 35 whose other input terminal is connected to a return connection 36. The output of the amplifier 36 is connected to the control winding of a reversible motor 37 which adjusts a wiper 38 along a resistor 39 which is connected across the source 33. The wiper 38 produces a controlling voltage in a manner similar to the wiper 17 of Figure 1.

The wiper 38 is connected across a resistor 41 which has a wiper 42 adjustable therealong. The wiper 42 may be adjusted manually or automatically by a regulator 43 in response to the availability of the first factor, for example the by-product fuel. The wiper 42 is connected to one input terminal of an amplifier 44 whose output is connected to the control winding of a reversible motor 45.

The motor 45 may control the supply of the first factor and also adjust a wiper 46 along a resistor 47 which is connected across the source 33. The wiper 46 is connected across a voltage divider, including resistors 48 and 49 in series, and the midpoint between the resistors is connected to the other input terminal of the amplifier 44. The midpoint between the resistors 48 and 49 is also connected through the primary winding of a transformer 51 with the wiper 38 and across the primary winding of a transformer 52 to supply a rebalancing voltage. The voltage divider is employed so that the wiper 46 will have a greater than normal movement to rebalance the voltage at the wiper 42. Therefore, when the wiper 46 reaches one end of the resistor 47, at which point a mechanical stop may be provided, the wiper 42 and wiper 38 will still have additional travel to effect further control operations. Movement of the wiper 46 to one end of the resistor 47 would represent the condition in which all of the first factor available is being supplied and any additional demand must be met by supplying a second factor, such as a standby fuel.

Supply of the second factor is controlled in response to voltage across the secondary winding of the transformer 51. For this purpose the transformer 51 is connected to one input terminal of an amplifier 53 whose other input terminal is connected to a wiper 54 movable along a resistor 55, which is connected across the source 33. The amplifier 53 controls a reversible motor 56, which is connected to the wiper 54 to adjust it. The wiper 54 is also connected across the primary winding of a transformer 57 whose secondary winding is in series with the secondary of the transformer 52 in the return connection 36.

In operation of the system of Figure 2, any change in demand will adjust the wiper 38 to change the controlling voltage across the resistor 41 so that the voltage at the wiper 42 is correspondingly changed. This will cause the motor 45 to operate to adjust the first factor and simultaneously to move the wiper 46. If the wiper 46 can move far enough to rebalance the voltage at the wiper 42 through the voltage divider 48—49, there will be no voltage produced in the transformer 51 and the system will come to balance without adjusting the motor 56. However, if the wiper 46 is adjusted to its maximum limit and is still unable to rebalance to voltage at the wiper 42, a voltage will be produced in the transformer 51 which is proportional to the voltage unbalance between wipers 42 and 46. At this time the motor 46 will be operated to control supply of a second factor and to adjust the wiper 54 to a position to rebalance the voltage in the transformer 51. The voltage developed at the wiper 54 will be added to that at the midpoint between the voltage divider resistors 48 and 49 through the transformers 52 and 57 to rebalance the demand signal voltage at the wiper 51. Thus in operation of this circuit, only the first factor is controlled up to the limit of its availability and thereafter the second factor is controlled to supply any excess of demand over the availability of the first factor.

When it is desired to control still a third factor in response to the total of the first and second factors, as for example a total air supply, an additional control unit as shown in Figure 2 may be provided. This unit includes a resistor 58 connected between the return connection 36 and the common ground connection having a wiper 59 adjustable therealong. The wiper 59 is connected to one input terminal of an amplifier 61 whose other input terminal is connected to a wiper 62 movable along a resistor 63. The resistor 63 is connected across the source 33 as shown. The amplifier 61 supplies the control winding of a reversible motor 64 which adjusts the wiper 62 and which may also control the third factor, such as total air supply.

Since the voltage across the resistor 58 is equal to the total return voltage which is in turn proportional to the total supply of the several factors it will be seen that the motor 64 is adjusted in proportion to the total of the first factors being supplied. The motor 64 may, therefore, accurately control the supply of a third factor, such as total air, to maintain it in accurate proportion to the total supply of several fuels.

While two embodiments of the invention have been illustrated and described in detail, it will be understood that these are illustrative only and are not to be taken as a definition of the scope of the invention, reference being had for this purpose to the appended claims.

What is claimed is:

1. In an electrical control circuit, a source of electric signals, a return connection, means responsive to the voltage difference between the source and the return connection to produce a controlling voltage, a plurality of voltage producing devices connected to said means and responsive to the controlling voltage, a plurality of variable rebalancing voltage sources, means responsive to the voltage differences between the voltage producing devices and the rebalancing voltage sources respectively to adjust the rebalancing voltage sources, and voltage adding means connected to the rebalancing voltage sources and to the return connection to add the voltages at the sources and apply the sum thereof to the return connection.

2. The construction of claim 1 in which the voltage adding means comprises a plurality of transformers having their secondaries connected in series in the return connection and their primaries connected across the rebalancing voltage sources respectively.

3. In an electrical control circuit, a source of electric signals, a return connection, means responsive to the voltage difference between the source and the return connection to produce a controlling voltage, a plurality of impedance elements connected in parallel to said means to produce voltages proportional to the controlling voltage, a plurality of variable rebalancing voltage sources, means responsive to the voltage differences between the impedance elements and the rebalancing voltage sources respectively to adjust the rebalancing voltage sources, and voltage adding means correcting the rebalancing voltage sources to the return connection.

4. In an electrical control circuit, a source of electric signals, a return connection, means responsive to the voltage difference between the source and the return connection to produce a controlling voltage, a first voltage producing device connected to said means and responsive to the controlling voltage, a first variable rebalancing voltage source, means responsive to the voltage difference between the first device and the first rebalancing source to adjust the first rebalancing source, a connection from the first rebalancing source to the return connection, a second voltage producing device responsive to the voltage difference between said means and the first rebalancing source, a second variable rebalancing voltage source, means responsive to the voltage difference between the second device and the second rebalancing source to adjust the second rebalancing source, and a connection from the second rebalancing source to the return connection.

5. The construction of claim 4 in which the connections from the rebalancing sources to the return connection include transformers having their secondaries in series in the return connection and their primaries connected across the rebalancing sources respectively.

6. In an electrical control circuit, a source of electric signals, a return connection, means responsive to the voltage difference between the source and the return connection to produce a controlling voltage, a first voltage producing device connected to said means and responsive to the controlling voltage, a first variable rebalancing voltage source, means responsive to the voltage difference between the first device and the first rebalancing source to adjust the first rebalancing source, a connection from the first rebalancing source to the return connection, a second voltage producing device responsive to the voltage difference between said means and the first rebalancing source, a second variable rebalancing voltage source, means responsive to the voltage difference between the second device and the second rebalancing source to adjust the second rebalancing source, a connection from the second rebalancing source to the return connection, a third voltage producing device responsive to the return connection voltage, a third rebalancing voltage source, and means responsive to the voltage difference between the third device and the third rebalancing source to adjust the third rebalancing source.

7. In an electrical control circuit, a source of electric signals, a return connection, means responsive to the voltage difference between the source and the return connection to produce a controlling voltage, a first voltage producing device connected to said means and responsive to the controlling voltage, a first variable rebalancing voltage source, means responsive to the voltage difference between the first device and the first rebalancing source to adjust the first rebalancing source, a connection from the first rebalancing source to the return connection, a transformer having its primary connected between the first named means and the first rebalancing source, the first rebalancing source having less voltage producing capacity than the first named means whereby the transformer primary will be energized only after the first rebalancing source has been adjusted to the limit of its capacity, a second variable rebalancing voltage source, means responsive to the voltage difference in the transformer secondary and the second rebalancing source to adjust the second rebalancing source, and a connection from the second rebalancing source to the return connection.

References Cited in the file of this patent

UNITED STATES PATENTS 2,644,642    Smoot _____ July 7, 1953